United States Patent
Lin et al.

(10) Patent No.: US 12,498,628 B2
(45) Date of Patent: Dec. 16, 2025

(54) PROJECTION APPARATUS

(71) Applicant: Coretronic Corporation, Hsin-Chu (TW)

(72) Inventors: Chun-Ting Lin, Hsin-Chu (TW); Cheng-Yu Yeh, Hsin-Chu (TW); Yu-Wei Guo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 454 days.

(21) Appl. No.: 18/319,433

(22) Filed: May 17, 2023

(65) Prior Publication Data
US 2023/0384658 A1    Nov. 30, 2023

(30) Foreign Application Priority Data

May 30, 2022  (CN) .......................... 202210598355.X
Nov. 18, 2022 (CN) .......................... 202211445139.8

(51) Int. Cl.
*G03B 21/16*    (2006.01)
*G03B 21/14*    (2006.01)

(52) U.S. Cl.
CPC ........... *G03B 21/16* (2013.01); *G03B 21/145* (2013.01)

(58) Field of Classification Search
CPC ............................. G03B 21/16; G03B 21/145
See application file for complete search history.

(56) References Cited

U.S. PATENT DOCUMENTS

| | | | |
|---|---|---|---|
| 11,036,118 B2 | 6/2021 | Chung et al. | |
| 11,143,942 B2 | 10/2021 | Huang et al. | |
| 2009/0207382 A1* | 8/2009 | Hsiao | G03B 21/16 353/58 |
| 2011/0157560 A1* | 6/2011 | Hsiao | G03B 21/16 353/58 |
| 2014/0092368 A1* | 4/2014 | Dai | G03B 21/16 353/58 |
| 2017/0038665 A1* | 2/2017 | Chen | H04N 9/3144 |
| 2018/0231878 A1* | 8/2018 | Lin | G03B 21/16 |
| 2020/0041883 A1* | 2/2020 | Chung | G03B 21/208 |
| 2020/0041884 A1* | 2/2020 | Chung | G03B 21/16 |
| 2020/0387058 A1* | 12/2020 | Huang | G03B 21/16 |
| 2020/0401027 A1* | 12/2020 | Zhao | G03B 21/2033 |
| 2023/0004075 A1 | 1/2023 | Lin et al. | |

FOREIGN PATENT DOCUMENTS

CN    208673015    3/2019

* cited by examiner

*Primary Examiner* — Bao-Luan Q Le
(74) *Attorney, Agent, or Firm* — JCIPRNET

(57) ABSTRACT

A projection apparatus includes a casing, a projection lens, a first fan, a first light source module, a second light source module, a first heat dissipation module, and a second heat dissipation module. A disposing direction of the projection lens divides an accommodating space of the casing into a first region and a second region. The first fan, the first light source module, the second light source module, the first heat dissipation module, and the second heat dissipation module are located in the first region. The first heat dissipation module includes a first heat dissipation fin set and a first heat pipe. The first heat pipe is connected to the first base of the first light source module and the first heat dissipation fin set. The first heat dissipation fin set is disposed adjacent to a first air inlet, and in an axial direction of the first fan.

23 Claims, 5 Drawing Sheets

PROJECTION APPARATUS

CROSS-REFERENCE TO RELATED APPLICATION

This application claims the priority benefits of China application serial no. 202210598355.X, filed on May 30, 2022 and China application serial no. 202211445139.8, filed on Nov. 18, 2022. The entirety of each of the above-mentioned patent applications is hereby incorporated by reference herein and made a part of this specification.

BACKGROUND

Technical Field

The disclosure relates to an optical device, and in particular to a projection apparatus.

Description of Related Art

Generally, the main heat sources in a projection apparatus are a light source and a light valve. Nowadays, for high brightness and high resolution, in addition to increasing the wattage of the light source, the number of lenses inside the projection lens is also increased. The increase in the wattage of the light source will increase the heat generated by the light source and the light valve, while increasing the number of lenses will increase the length of the projection lens, and the distance between the rear cover and the projection wall will compress the heat dissipation space inside the system under the condition that the number of projection inches remains the same. Therefore, how to solve the heat dissipation problem of high brightness light sources and improve the heat dissipation efficiency of light sources and light valves under the limited space is one of the urgent problems to be solved.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection apparatus having better heat dissipation effect and capable of effectively reducing the noise generated by the fan.

Other objects and advantages of the disclosure can be further understood from the technical features disclosed in the disclosure.

In order to achieve one or part or all of the above purposes or other purposes, an embodiment of the disclosure provides a projection apparatus including a casing, a projection lens, a first fan, a first light source module, a second light source module, a first heat dissipation module, and a second heat dissipation module. The case has a first side, a second side, a third side, and a fourth side. The first side has a first air inlet, the second side has a second air inlet, the third side has an air outlet, the fourth side does not have an air inlet and an air outlet, and the casing forms an accommodating space. The projection lens is disposed in the casing, and the projection lens has a disposing direction. The disposing direction is parallel to the first side and the third side, and the disposing direction of the projection lens divides the accommodating space into a first region and a second region. The first air inlet and the second air inlet are located in the first region, and the first air inlet is perpendicular to the second air inlet. The air outlet is located in the second region, and the air outlet is parallel to the first air inlet. The first fan, the first light source module, the second light source module, the first heat dissipation module, and the second heat dissipation module are located in the first region. A first base of the first light source module is connected to the first heat dissipation module, and a second base of the second light source module is connected to the second heat dissipation module. The first heat dissipation module includes a first heat dissipation fin set and a first heat pipe. The first heat pipe is connected to the first base of the first light source module and the first heat dissipation fin set. The first heat dissipation fin set is disposed adjacent to the first air inlet, and in an axial direction of the first fan.

Based on the above, the embodiments of the disclosure have at least one of the following advantages or effects. In the design of the projection apparatus of the disclosure, the first heat pipe of the first heat dissipation module is connected to the first base of the first light source module and the first heat dissipation fin set, the first heat dissipation fin set of the first heat dissipation module is disposed adjacent to the first air inlet, and in the axial direction of the first fan. Therefore, the projection apparatus of the disclosure may have better heat dissipation efficiency, and may effectively reduce the noise generated by the fan.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWING

The accompanying drawings are included to provide a further understanding of the disclosure, and are incorporated in and constitute a part of this specification. The drawings illustrate examples of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component "component is directly "adjacent to" "B" component or one or more additional components are between "A" component and "B" component. Accordingly, the drawings and descriptions will be regarded as illustrative in nature and not as restrictive.

Figure 1:
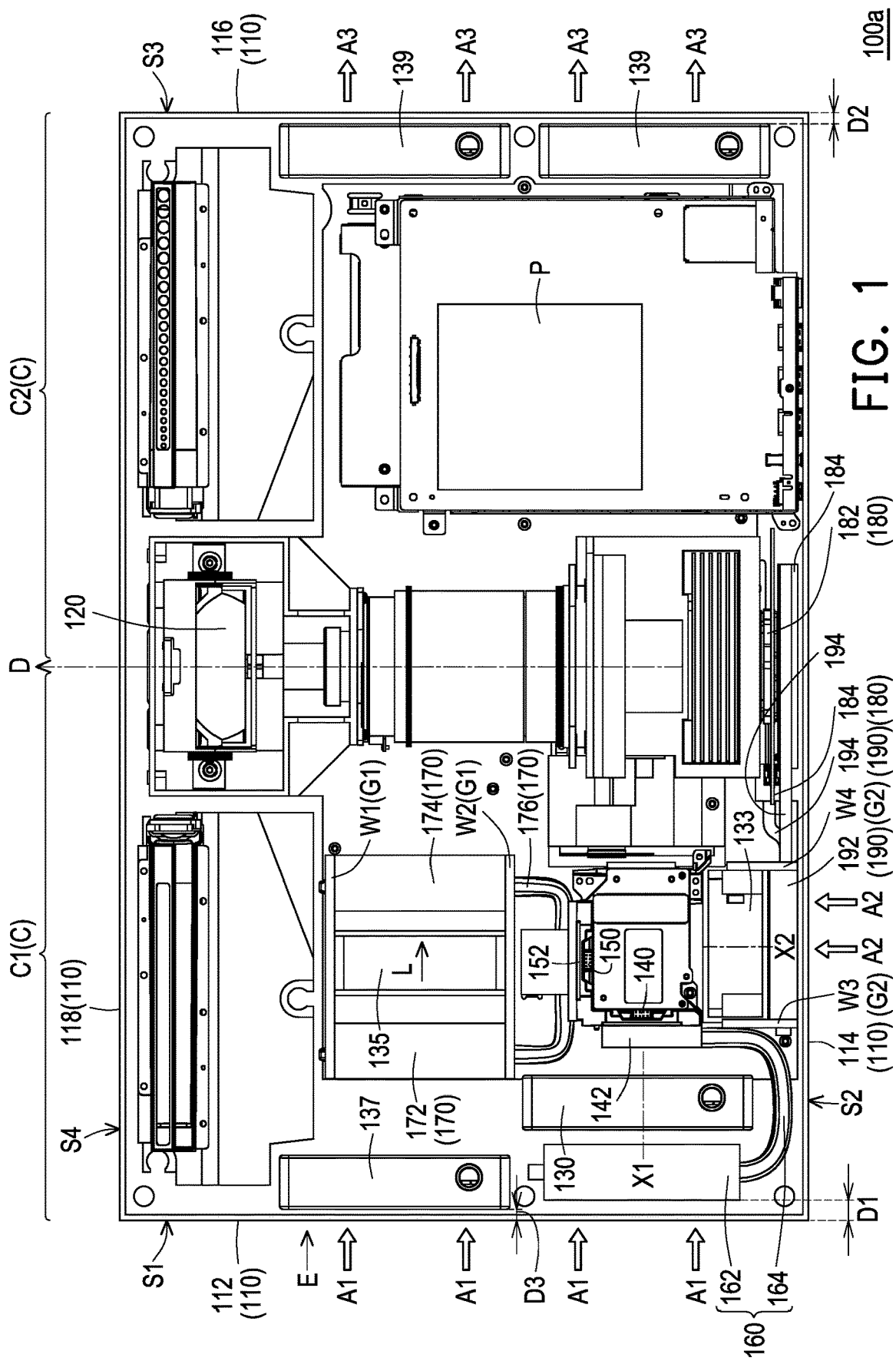
FIG. 1 is a schematic top view of a projection apparatus according to an embodiment of the disclosure.
Figure 2:
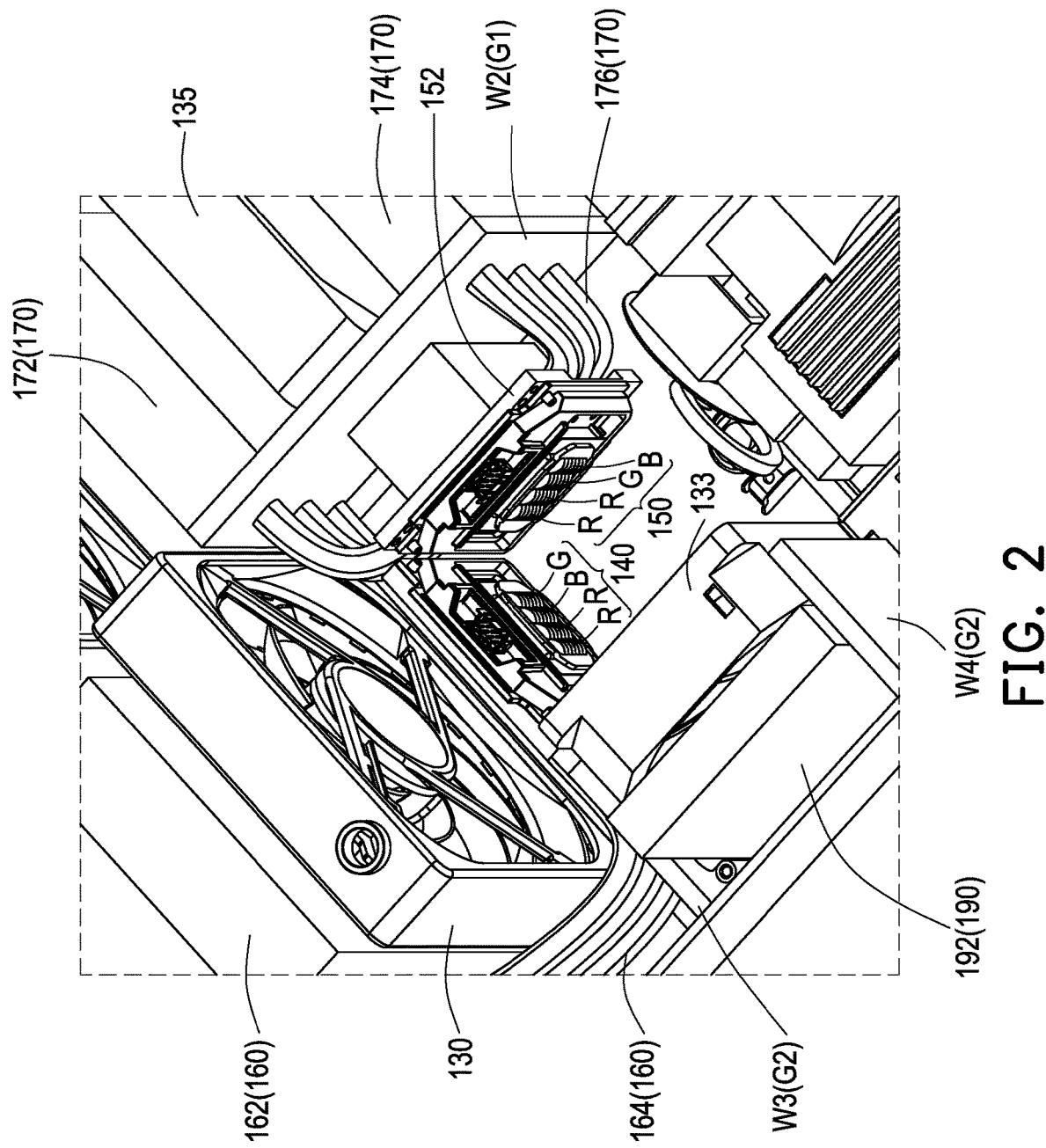
FIG. 2 is a three-dimensional schematic view of a first light source module and a second light source module in the projection apparatus of FIG. 1.
Figure 3:
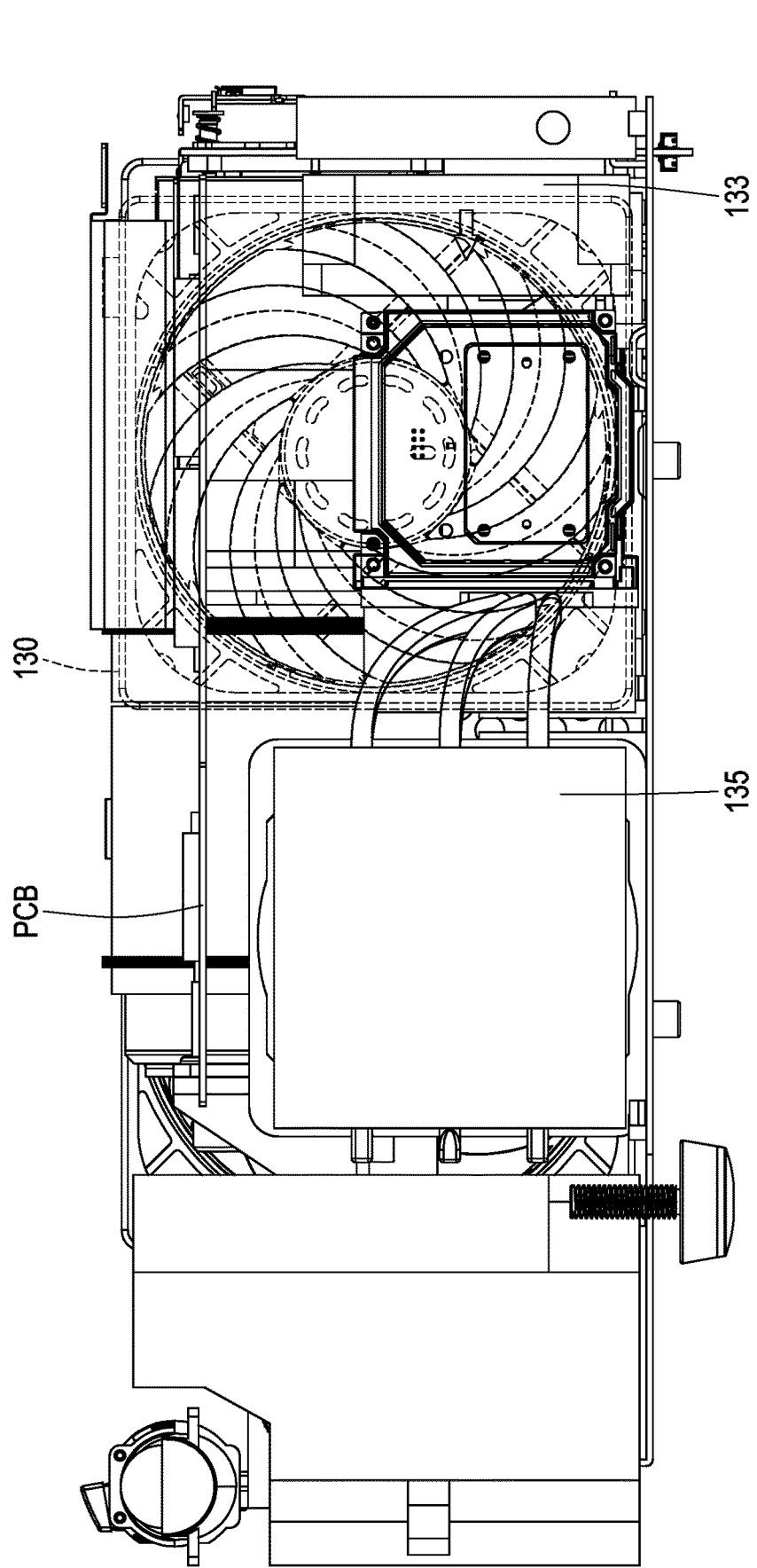
FIG. 3 is a schematic side view of the projection apparatus of FIG. 1.
Figure 4:
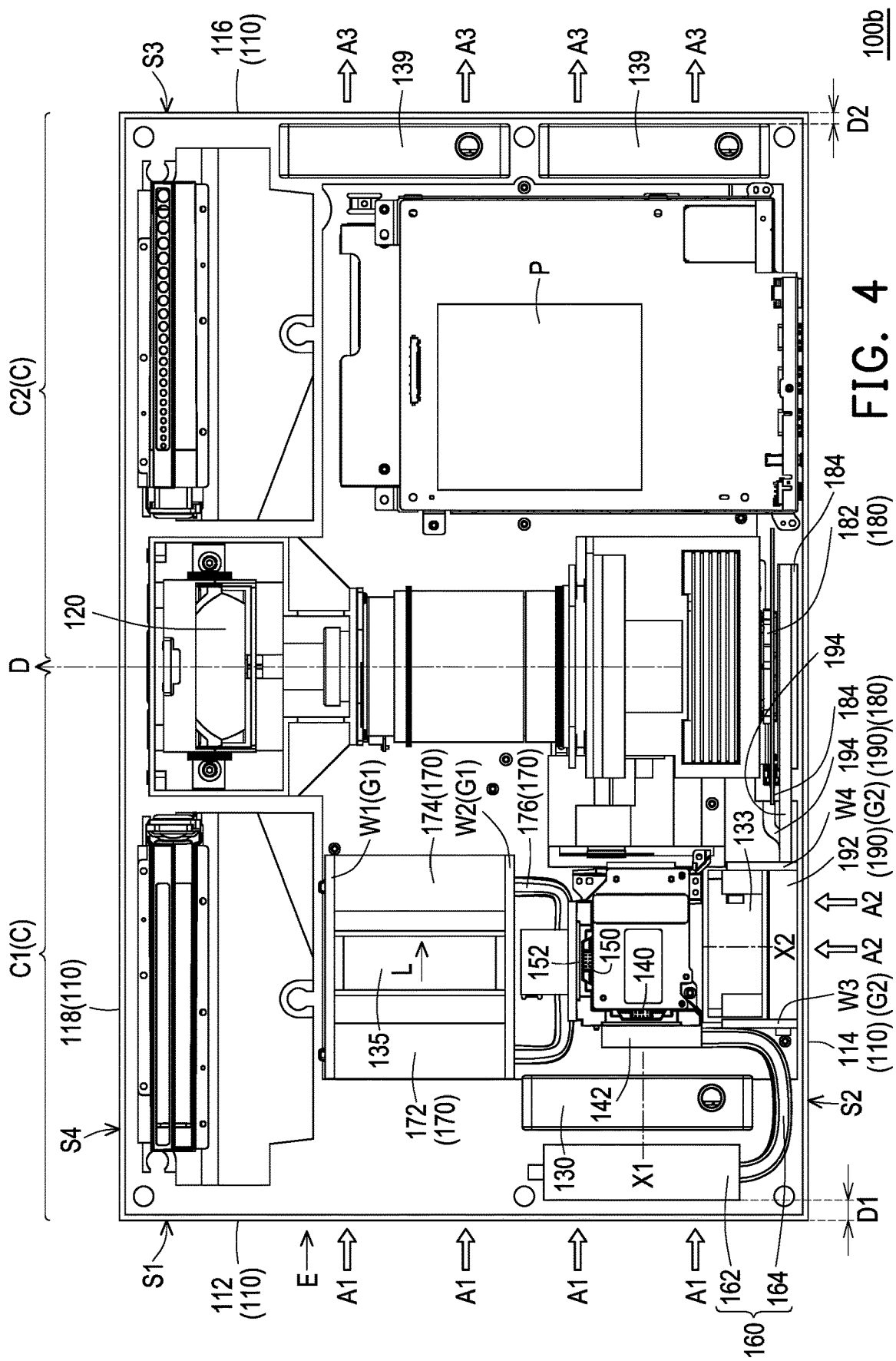
FIG. 4 is a schematic top view of a projection apparatus according to another embodiment of the disclosure.

FIG. 1 is a schematic top view of a projection apparatus according to an embodiment of the disclosure. FIG. 2 is a three-dimensional schematic view of a first light source module and a second light source module in the projection apparatus of FIG. 1. FIG. 3 is a schematic side view of the projection apparatus of FIG. 1. FIG. 4 is a schematic top view of a projection apparatus according to another embodiment of the disclosure.

Referring to FIG. 1, according to this embodiment, a projection apparatus 100a includes a casing 110, a projection lens 120, a first fan 130, a first light source module 140, a second light source module 150, a first heat dissipation module 160, and a second heat dissipation module 170.

The casing 110 has a first side S1, a second side S2, a third side S3, and a fourth side S4. The first side S1 has a first air inlet A1, the second side S2 has a second air inlet A2, the third side S3 has an air outlet A3, the fourth side S4 does not have an air inlet and an air outlet, and the casing 110 forms an accommodating space C. In detail, the casing 110 includes a front cover 118, a rear cover 114, a first side cover 112, and a second side cover 116. The front cover 118 and the rear cover 114 are opposite to each other, and the first side cover 112 and the second side cover 116 are opposite to each other and are connected to the front cover 118 and the rear cover 114. The front cover 118, the rear cover 114, the first side cover 112, and the second side cover 116 define the accommodating space C. The first air inlet A1 is disposed on the first side cover 112, the second air inlet A2 is disposed on the rear cover 114, and the air outlet A3 is disposed on the second side cover 116.

The projection lens 120 is disposed in the casing 110, and the projection lens 120 has a disposing direction D. The disposing direction D is parallel to the first side S1 and the third side S3, and the disposing direction D of the projection lens 120 divides the accommodating space C into a first region C1 and a second region C2. Here, the projection lens 120 is located in the middle of the casing 110, for example, so a size of the first region C1 and a size of the second region C2 may be approximately the same, but not limited thereto. As shown in FIG. 1, the first air inlet A1 and the second air inlet A2 are located in the first region C1, and the first air inlet A1 is perpendicular to the second air inlet A2. The air outlet A3 is located in the second region C2, and the air outlet A3 is parallel to the first air inlet A1.

Referring to FIG. 1 again, according to this embodiment, the first fan 130, the first light source module 140, the second light source module 150, the first heat dissipation module 160, and the second heat dissipation module 170 are located in the first region C1. A first base 142 of the first light source module 140 is connected to the first heat dissipation module 160, and a second base 152 of the second light source module 150 is connected to the second heat dissipation module 170. As shown in FIG. 2, the first light source module 140 and the second light source module 150 according to this embodiment may respectively include at least one red light emitting diode R (schematically illustrated two), at least one green light emitting diode G (schematically illustrated one), and at least one blue light emitting diode B (schematically illustrated one). Preferably, a duty cycle of the first light source module 140 is the same as a duty cycle of the second light source module 150.

Referring to FIG. 1 again, according to this embodiment, the first heat dissipation module 160 includes a first heat dissipation fin set 162 and a first heat pipe 164. The first heat pipe 164 is connected to the first base 142 of the first light source module 140 and the first heat dissipation fin set 162. The first heat dissipation fin set 162 is disposed adjacent to the first air inlet A1, and in an axial direction X1 of the first fan 130, the first heat dissipation fin set 162 is located between the first air inlet A1 and the first fan 130. In other word, according to this embodiment, the first fan 130 is disposed downstream of the first heat dissipation fin set 162, and the first fan 130 makes the cold air from outside enter the casing 110 through the first air inlet A1, and the cold air passes upstream through the first heat dissipation fin set 162, thereby improving the cooling efficiency of the first heat dissipation fin set 162 and allowing the first light source module 140 to effectively dissipate heat. By arranging the first heat dissipation fin set 162, the first fan 130, and the first base 142 from upstream to downstream, it not only improves the heat dissipation efficiency but also has a sound shielding effect, which may reduce the operation noise of the first fan 130 from being transmitted to the outside and affecting the user's experience.

In the simulation, under the temperature conditions set by the first light source module 140 and the second light source module 150, the system noise according to this embodiment may be reduced by at least 4 dB (e.g., from 32 dB to 28 dB) compared to the existing arrangement of fans, heat dissipation fins, and heat dissipation bases from upstream to downstream, and the system demand flow may be maintained.

Referring to FIG. 1 again, the second heat dissipation module 170 according to this embodiment includes a second heat dissipation fin set 172, a third heat dissipation fin set 174, and a second heat pipe 176 connecting the second heat dissipation fin set 172 and the third heat dissipation fin set 174. The second base 152 of the second light source module 150 is connected to the second heat pipe 176. Here, the second heat dissipation fin set 172, the third heat dissipation fin set 174, and the second heat pipe 176 are, for example, arranged in a U-shape. Furthermore, the projection apparatus 100a further includes a second fan 135 disposed between the second heat dissipation fin set 172 and the third heat dissipation fin set 174, thereby increasing the flow rate. An air outlet direction L of the second fan 135 is parallel to an air inlet direction E of the first air inlet A1. As shown in FIG. 3, a size of the first fan 130 according to this embodiment is substantially larger than a size of the second fan 135. Although the size of the second fan 135 is smaller than the size of the first fan 130, the heat dissipation efficiency may be improved because the second heat dissipation fin set 172, the third heat dissipation fin set 174, and the second heat pipe 176 are arranged in a U shape.

To improve the heat dissipation efficiency, the projection apparatus 100a according to this embodiment further includes an air guide plate G1 covering the second heat dissipation module 170. The air guide plate G1 includes two side walls W1 and W2 respectively disposed on opposite sides of the second heat dissipation module 170 along a direction perpendicular to the disposing direction D, so that the airflow entering from the first air inlet A1 is guided between the two walls W1 and W2 and passes through the second heat dissipation fin set 172, the second fan 135 and the third heat dissipation fin set 174 in sequence.

Furthermore, the projection apparatus 100a according to this embodiment further includes a second fan 137 disposed in the casing 110 and located in the first region C1. The second fan 137 is adjacent to the first air inlet A1. The first fan 130 corresponds to the first heat dissipation module 160, and the second fan 137 corresponds to the second heat dissipation module 170. Here, there is a first distance D1 between the first fan 130 and the first air inlet A1, a second distance D3 between the second fan 137 and the first air inlet A1, and the first distance D1 is greater than the second distance D3. Of course, in order to achieve the need for noise reduction, the second fan 137 may be left out as shown in a projection device 100b of FIG. 4, which still falls within the scope of protection intended by the disclosure.

Referring to FIG. 1 again, the projection apparatus 100a according to this embodiment further includes an optical engine 180 and a third heat dissipation module 190. The optical engine 180 is disposed in the casing 110 and connected to the projection lens 120. The optical engine 180 includes a light valve 182. The light valve 182 is, for example, a digital micromirror device (DMD), but is not limited thereto. The third heat dissipation module 190 is disposed in the casing 110 and located in the first region C1. The third heat dissipation module 190 is disposed adjacent to the second air inlet A2, and the third heat dissipation module 190 includes a heat dissipation fin set 192 and at least one heat pipe 194 passing through the heat dissipation fin set 192. The heat pipe 194 is connected to a heat dissipation module base 184. Furthermore, the projection apparatus 100a according to this embodiment further includes a second fan 133 disposed in the casing 110 and located in the first region C1. The second fan 133 is adjacent to the second air inlet A2, and in an axial direction X2 of the second fan 133, the heat dissipation fin set 192 is located between the second air inlet A2 and the second fan 133.

Since the heat dissipation fin set 192 is located at the second air inlet A2, the external cold air may directly dissipate and cool the heat dissipation fin set 192 without passing through any heating element, allowing the light valve 182 connected through the heat dissipation module 190 to dissipate heat. Through the above-mentioned design, in addition to effectively reducing the volume of the heat dissipation fin set 192, that is, reducing the disposition of the heat dissipation volume, but also has a better cooling efficiency. In addition, the second fan 133 is disposed downstream of the heat dissipation fin set 192, which not only may effectively improve the heat dissipation efficiency of the heat dissipation fin set 192, but also may reduce the operation noise of the second fan 133 from being transmitted to the outside and affecting the user's experience.

Furthermore, to improve the heat dissipation efficiency, the projection apparatus 100a according to this embodiment may further include an air guide plate G2 covering the third heat dissipation module 190 and is connected to the second fan 133. The air guide plate G2 includes two side walls W3 and W4 respectively disposed on opposite sides of the third heat dissipation module 190, so that the airflow entering from the second air inlet A2 is guided between the two side walls W3 and W3 and passes through the heat dissipation fin set 192 and the second heat dissipation fin set 133 in sequence. Here, as shown in FIG. 3, the size of the first fan 130 is, for example, larger than a size of the second fan 133. Although the size of the second fan 133 is smaller than the size of the first fan 130, the second fan 133 may increase the heat dissipation efficiency by increasing a rotational speed of the second fan 133 because the second fan 133 is located downstream of the heat dissipation fin set 192, which has the effect of sound shielding.

Referring to FIG. 1 again, the projection apparatus 100a according this embodiment further includes a third fan 139 disposed in the casing 100 and located in the second region C2. The third fan 139 is disposed adjacent to the air outlet A3 along a direction parallel to the disposing direction D. There is a first distance D1 between the first fan 130 and the first air inlet A1, a second distance D2 between the third fan 139 and the air outlet A3, and the first distance D1 is greater than the second distance D2. That is, the first fan 130 is farther from the edge of the casing 110 than the third fan 139, which may reduce the operation noise of the first fan 130 from being transmitted to the outside and affecting the user's experience. Preferably, a rotational speed of the first fan 130 may be greater than or equal to a rotational speed of the third fan 139, thereby improving the heat dissipation efficiency of the first light source module 140. Similarly, the rotational speed of the second fan 133 may also be greater than or equal to the rotational speed of the third fan 139 to improve the heat dissipation efficiency of the optical engine 180. In addition, the projection apparatus 100a according to this embodiment further includes a power module P disposed in the casing 110 and located in the second region C2. The power module P is located between the projection lens 120 and the air outlet A3 to provide power.

In short, according to this embodiment, the first fan 130 is disposed downstream of the first heat dissipation fin set 162, thereby improving the heat dissipation efficiency of the first heat dissipation fin set 160 to the first light source module 140, and reducing the fan noise by at least 4 dB. Therefore, the projection apparatuses 100a and 100b according to this embodiment may have better heat dissipation efficiency, and may effectively reduce the noise generated by the fan. In addition, the heat dissipation fin set 192 is located at the second air inlet A2, so the external cold air may directly dissipate and cool the heat dissipation fin set 192 without passing through any heating element, allowing the optical engine 180 connected through the heat pipe 194 to have a better heat dissipation effect. Furthermore, disposing the second fan 133 downstream of the heat dissipation fin set 192 may not only effectively improve the heat dissipation efficiency of the heat dissipation fin set 192, but also reduce the operation noise of the second fan 133 from being transmitted to the outside and affecting the user's experience. With the above design, the system space above the optical engine 180 may also be released (e.g., printed circuit board may be placed), which may maximize the system space utilization without increasing the height of the system machine.

Figure 5:
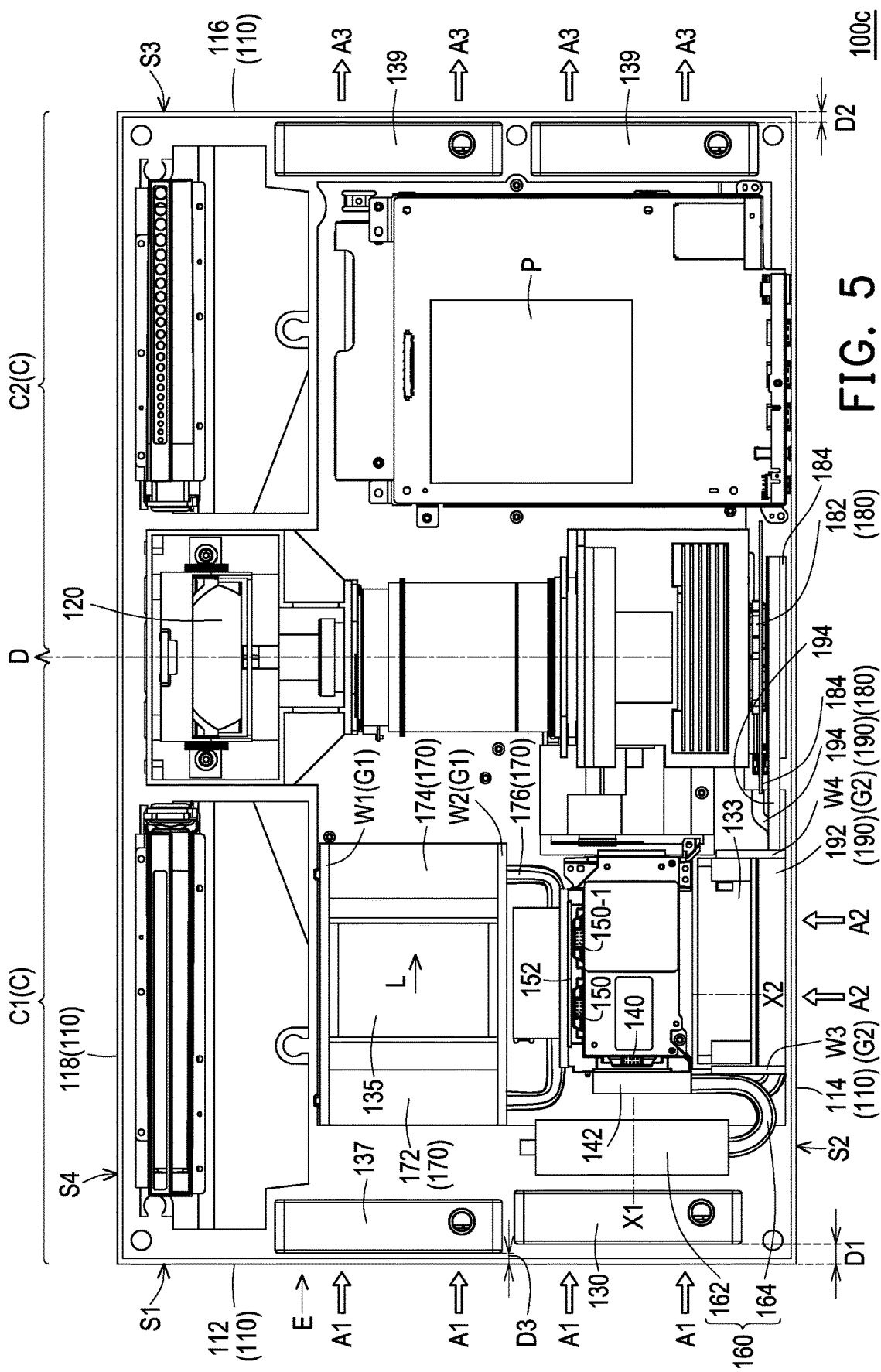
FIG. 5 is a schematic top view of a projection apparatus according to another embodiment of the disclosure.

FIG. 5 is a schematic top view of a projection apparatus according to another embodiment of the disclosure. According to this embodiment, a projection apparatus 100c includes the casing 110, the projection lens 120, the first fan 130, the first light source module 140, the second light source module 150, the first heat dissipation module 160, and the second heat dissipation 170. The present embodiment in FIG. 5 is similar to the embodiment in FIG. 1, and the positions and functions of some components are consistent, so details are not repeated here.

The difference between this embodiment in FIG. 5 and the embodiment in FIG. 1 is that this embedment may further include a third light source module 150-1. The third light source module 150-1 includes at least one green light emitting diode for emitting green light beams. The second light source module 150 and the third light source module 150-1 are commonly connected to the second base 152, and the second base 152 is connected to the second heat dissipation 170. As shown in FIG. 2, the first light source module 140 and the second light source module 150 according to this embodiment may respectively include at least one red light emitting diode R (schematically illustrated two), at least one green light emitting diode G (schematically illustrated one), and at least one blue light emitting diode B (schematically illustrated one). Preferably, a duty cycle of the first light source module 140 is the same as a duty cycle of the second light source module 150. Wherein, the light emitting diode can be replaced by laser diode.

Referring to FIG. 5 again, according to this embodiment, the first heat dissipation module 160 includes the first heat dissipation fin set 162 and the first heat pipe 164. The first heat pipe 164 is connected to the first base 142 of the first light source module 140, the first heat dissipation fin set 162 and the heat dissipation fin set 192 of the third heat dissipation module 190. The first fan 130 is disposed adjacent to the first air inlet A1, and the first fan 130 is located between the first air inlet A1 and the first heat dissipation fin set 162. The first heat dissipation fin set 162 is located in axial direction X1 of the first fan 130. That is to say, in this embodiment, the first heat dissipation fin set 162 is disposed downstream of the first fan 130. The first fan 130 makes the external cold air enter the casing 110 through the first air inlet A1 by drafting, and the cold air passes through the first heat dissipation fin set 162, thereby improving the heat dissipation efficiency of the first heat dissipation fin set 162, so that the first light source module 140 can effectively dissipate heat. Through the arrangement sequence of the first fan 130, the first heat dissipation fin set 162 and the first base 142 from upstream to downstream, the heat dissipation efficiency can be improved.

Referring to FIG. 5 again, the second heat dissipation module 170 according to this embodiment includes the second heat dissipation fin set 172, the third heat dissipation fin set 174, and the second heat pipe 176 connecting the second heat dissipation fin set 172 and the third heat dissipation fin set 174. The second light source module 150 and the third light source module 150-1 are connected to the second base 152, and the second base 152 is connected to the second heat pipe 176.

Here, the second heat dissipation fin set 172, the third heat dissipation fin set 174, and the second heat pipe 176 are, for example, arranged in a U-shape. Furthermore, the projection apparatus 100c further includes the second fan 135 disposed between the second heat dissipation fin set 172 and the third heat dissipation fin set 174, thereby increasing the flow rate. An air outlet direction L of the second fan 135 is parallel to an air inlet direction E of the first air inlet A1. As shown in FIG. 3, a size of the first fan 130 according to this embodiment is substantially larger than a size of the second fan 135. Although the size of the second fan 135 is smaller than the size of the first fan 130, the heat dissipation efficiency may be improved because the second heat dissipation fin set 172, the third heat dissipation fin set 174, and the second heat pipe 176 are arranged in a U shape.

To improve the heat dissipation efficiency, the projection apparatus 100c according to this embodiment further includes the air guide plate G1 covering the second heat dissipation module 170. The air guide plate G1 includes two side walls W1 and W2 respectively disposed on opposite sides of the second heat dissipation module 170 along a direction perpendicular to the disposing direction D, so that the airflow entering from the first air inlet A1 is guided between the two walls W1 and W2 and passes through the second heat dissipation fin set 172, the second fan 135 and the third heat dissipation fin set 174 in sequence.

Referring to FIG. 5 again, the projection apparatus 100c according to this embodiment further includes the optical engine 180 and the third heat dissipation module 190. The optical engine 180 is disposed in the casing 110 and connected to the projection lens 120. The optical engine 180 includes a light valve 182. The light valve 182 is, for example, a digital micromirror device (DMD), but is not limited thereto. The third heat dissipation module 190 is disposed in the casing 110 and located in the first region C1. The third heat dissipation module 190 is disposed adjacent to the second air inlet A2, and the third heat dissipation module 190 includes a heat dissipation fin set 192 and at least one heat pipe 194 passing through the heat dissipation fin set 192. The heat pipe 194 is connected to a heat dissipation module base 184. Furthermore, the projection apparatus 100c according to this embodiment further includes the second fan 133 disposed in the casing 110 and located in the first region C1. The second fan 133 is adjacent to the second air inlet A2, and in an axial direction X2 of the second fan 133, the heat dissipation fin set 192 is located between the second air inlet A2 and the second fan 133.

Since the heat dissipation fin set 192 is located at the second air inlet A2, the external cold air may directly dissipate and cool the heat dissipation fin set 192 without passing through any heating element, allowing the light valve 182 connected through the heat dissipation module 190 to dissipate heat. Through the above-mentioned design, in addition to effectively reducing the volume of the heat dissipation fin set 192, that is, reducing the disposition of the heat dissipation volume, but also has a better cooling efficiency. In addition, the second fan 133 is disposed downstream of the heat dissipation fin set 192, which not only may effectively improve the heat dissipation efficiency of the heat dissipation fin set 192, but also may reduce the operation noise of the second fan 133 from being transmitted to the outside and affecting the user's experience.

Furthermore, to improve the heat dissipation efficiency, the projection apparatus 100c according to this embodiment may further include the air guide plate G2 covering the third heat dissipation module 190 and is connected to the second fan 133. The air guide plate G2 includes two side walls W3 and W4 respectively disposed on opposite sides of the third heat dissipation module 190, so that the airflow entering from the second air inlet A2 is guided between the two side walls W3 and W3 and passes through the heat dissipation fin set 192 and the second heat dissipation fin set 133 in sequence. Here, as shown in FIG. 5, the second fan 133 may increase the heat dissipation efficiency by increasing a rotational speed of the second fan 133 because the second fan 133 is located downstream of the heat dissipation fin set 192, which has the effect of sound shielding.

Furthermore, there is a first distance D1 between the first fan 130 and the first air inlet A1 of the projection apparatus 100c of this embodiment, a second distance D3 between the second fan 137 and the first air inlet A1, and the first distance D1 is greater than or equal to the second distance D3. There is a second distance D2 between the third fan 139 and the air outlet A3, and the first distance D1 is greater than or equal to the second distance D2.

Other technical features of this embedment in FIG. 5 are similar to those in the embodiment in FIG. 1, and will not repeated here.

To sum up, the embodiments of the disclosure have at least one of the following advantages or effects. In the design of the projection apparatus of the disclosure, the first heat pipe of the first heat dissipation module is connected to the first base of the first light source module and the first heat dissipation fin set, the first heat dissipation fin set of the first heat dissipation module is disposed adjacent to the first air inlet, and in the axial direction of the first fan, the first heat dissipation fin set is located between the first air inlet and the first fan. That is, in the disclosure, the first fan is disposed downstream of the first heat dissipation fin set, thereby improving the heat dissipation efficiency of the first heat dissipation fin set to the first light source module, and reducing fan noise by at least 4 dB. Therefore, the projection apparatus of the disclosure may have better heat dissipation efficiency, and may effectively reduce the noise generated by the fan.

In other embodiments, the first fan is disposed adjacent to the first air inlet and the first fan is located between the first air inlet and the first heat dissipation fin set. The first heat dissipation fin set is on the axial direction of the first fan. That is to say, in this embodiment, the first heat dissipation fin set is disposed downstream of the first fan. The first fan makes the external cold air enter the casing through the first air inlet by drafting, and the cold air passes through the first heat dissipation fin set, thereby improving the heat dissipation efficiency of the first heat dissipation fin set, so that the first light source module can effectively dissipate heat. Through the arrangement sequence of the first fan, the first heat dissipation fin set and the first base from upstream to downstream, the heat dissipation efficiency can be improved.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection apparatus, wherein the projection apparatus comprises a casing, a projection lens, a first fan, a first light source module, a second light source module, a first heat dissipation module, and a second heat dissipation module, wherein:

the casing has a first side, a second side, a third side, and a fourth side, wherein the first side has a first air inlet, the second side has a second air inlet, the third side has an air outlet, the fourth side does not have an air inlet and an air outlet, and the casing forms an accommodating space;

the projection lens is disposed in the casing, the projection lens has a disposing direction, the disposing direction is parallel to the first side and the third side, and the disposing direction of the projection lens divides the accommodating space into a first region and a second region, wherein the first air inlet and the second air inlet are located in the first region, the first air inlet is perpendicular to the second air inlet, the air outlet is located in the second region, and the air outlet is parallel to the first air inlet;

the first fan, the first light source module, the second light source module, the first heat dissipation module, and the second heat dissipation module are located in the first region, wherein a first base of the first light source module is connected to the first heat dissipation module, and a second base of the second light source module is connected to the second heat dissipation module; and the first heat dissipation module comprises a first heat dissipation fin set and a first heat pipe, the first heat pipe is connected to the first base of the first light source module and the first heat dissipation fin set, wherein the first heat dissipation fin set is disposed adjacent to the first air inlet, and in an axial direction of the first fan.

2. The projection apparatus according to claim 1, wherein the first heat dissipation fin set is located between the first air inlet and the first fan.

3. The projection apparatus according to claim 1, wherein the casing comprises a front cover, a rear cover, a first side cover, and a second side cover, the front cover and the rear cover are opposite to each other, the first side cover and the second side cover are opposite to each other and are connected to the front cover and the rear cover, the front cover, the rear cover, the first side cover and the second side cover define the accommodating space, the first air inlet is disposed on the first side cover, the second air inlet is disposed on the rear cover, and the air outlet is disposed on the second side cover.

4. The projection apparatus according to claim 1, wherein the second heat dissipation module comprises a second heat dissipation fin set, a third heat dissipation fin set, and a second heat pipe connecting the second heat dissipation fin set and the third heat dissipation fin set, the second base of the second light source module is connected to the second heat pipe.

5. The projection apparatus according to claim 4, wherein the second heat dissipation fin set, the third heat dissipation fin set, and the second heat pipe are arranged in a U shape.

6. The projection apparatus according to claim 4, further comprising:
a second fan disposed between the second heat dissipation fin set and the third heat dissipation fin set, wherein the second fan has an air outlet direction parallel to an air inlet direction of the first air inlet.

7. The projection apparatus according to claim 6, wherein a size of the first fan is larger than a size of the second fan.

8. The projection apparatus according to claim 1, further comprising:
an air guide plate covering the second heat dissipation module, wherein the air guide plate comprises two side walls respectively disposed on opposite sides of the second heat dissipation module along a direction perpendicular to the disposing direction.

9. The projection apparatus according to claim 1, further comprising:
an optical engine disposed in the casing and connected to the projection lens, and the optical engine comprising a light valve; and
a third heat dissipation module disposed in the casing and located in the first region, wherein the third heat dissipation module is disposed adjacent to the second air inlet, the third heat dissipation module comprises a heat dissipation fin set and at least one heat pipe passing through the heat dissipation fin set, and the at least one heat pipe is connected to a heat dissipation module base.

10. The projection apparatus according to claim 9, further comprising:
a second fan disposed in the casing and located in the first region, wherein the second fan is adjacent to the second air inlet, and in an axial direction of the second fan, the heat dissipation fin set is located between the second air inlet and the second fan.

11. The projection apparatus according to claim 10, further comprising:
an air guide plate covering the third heat dissipation module and connected to the second fan, wherein the air guide plate comprises two side walls respectively disposed on opposite sides of the third heat dissipation module.

12. The projection apparatus according to claim 10, wherein a size of the first fan is larger than a size of the second fan.

13. The projection apparatus according to claim 10, further comprising:
a third fan disposed in the casing and located in the second region, wherein the third fan is disposed adjacent to the air outlet along a direction parallel to the disposing direction.

14. The projection apparatus according to claim 13, wherein a rotational speed of the first fan is greater than or equal to a rotational speed of the third fan.

15. The projection apparatus according to claim 13, wherein a rotational speed of the second fan is greater than or equal to a rotational speed of the third fan.

16. The projection apparatus according to claim 13, wherein the first heat dissipation fin set is located between the first air inlet and the first fan, and there is a first distance between the first fan and the first air inlet, a second distance between the third fan and the air outlet, and the first distance is greater than the second distance.

17. The projection apparatus according to claim 1, further comprising:
a second fan disposed in the casing and located in the first region, wherein the second fan is adjacent to the first air inlet, wherein the first fan corresponds to the first heat dissipation module, and the second fan corresponds to the second heat dissipation module.

18. The projection apparatus according to claim 17, wherein the first heat dissipation fin set is located between the first air inlet and the first fan, and there is a first distance between the first fan and the first air inlet, a second distance between the second fan and the first air inlet, and the first distance is greater than the second distance.

19. The projection apparatus according to claim 1, further comprising:
a power module disposed in the casing and located in the second region, wherein the power module is located between the projection lens and the air outlet.

20. The projection apparatus according to claim 1, wherein the projection lens is located in the middle of the casing.

21. The projection apparatus according to claim 1, wherein the first light source module and the second light source module comprise at least one red light emitting diode, at least one green light emitting diode, and at least one blue light emitting diode, respectively.

22. The projection apparatus according to claim 1, wherein the first fan is disposed adjacent to the first air inlet, and the first fan is located between the first air inlet and the first heat dissipation fin set.

23. The projection apparatus according to claim 1, further comprising:
a third light source module, wherein the second light source module and the third light source module are connected to the second base, and the second base is connected to the second heat dissipation fin set.

* * * * *